United States Patent [19]

Carpenter

[11] Patent Number: 5,211,238
[45] Date of Patent: May 18, 1993

[54] METHOD USING MICRO-SPHERE CEMENT SLURRIES FOR DEVIATED WELLS

[75] Inventor: Robert B. Carpenter, Hurst, Tex.

[73] Assignee: Atlantic Richfield Company, Los Angeles, Calif.

[21] Appl. No.: 790,265

[22] Filed: Nov. 8, 1991

[51] Int. Cl.5 .................................. E21B 33/14
[52] U.S. Cl. ................................ 166/292; 166/50
[58] Field of Search ............. 166/292, 293, 294, 295, 166/285, 286, 50

[56] References Cited

U.S. PATENT DOCUMENTS

| | | | |
|---|---|---|---|
| 3,669,701 | 6/1972 | Biederman, Jr. | 166/292 X |
| 3,722,591 | 3/1973 | Maxson | 166/901 |
| 3,804,058 | 4/1974 | Messenger | 166/292 |
| 3,815,677 | 6/1974 | Pennebaker, Jr. | 166/285 X |
| 3,851,704 | 12/1974 | Maxson et al. | 166/292 |
| 4,632,876 | 12/1986 | Laird et al. | 166/292 X |
| 4,869,323 | 9/1989 | Stagg | 166/285 |
| 5,095,987 | 3/1992 | Weaver et al. | 166/50 X |

Primary Examiner—Stephen J. Novosad
Attorney, Agent, or Firm—Wofford, Fails, Zobal & Mantooth

[57] ABSTRACT

What is disclosed is an improved method of cementing downhole in deviated or horizontal sections of a well bore, characterized by an improved step of flowing into the well a micro-sphere laden cement slurry and letting it set up in the set cement in situ to provide zonal isolation, bond equipment in the well.

10 Claims, 1 Drawing Sheet

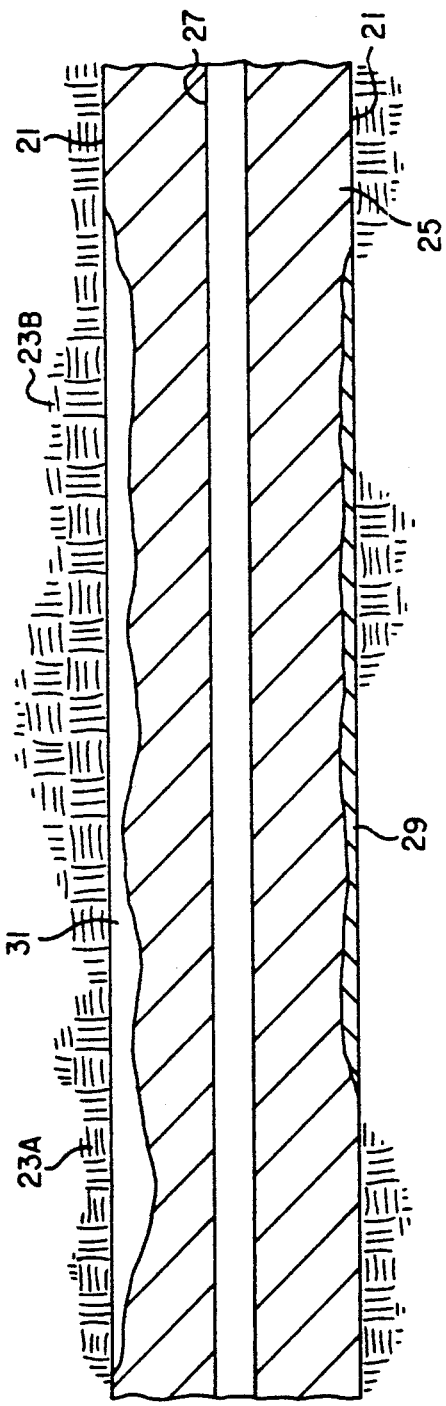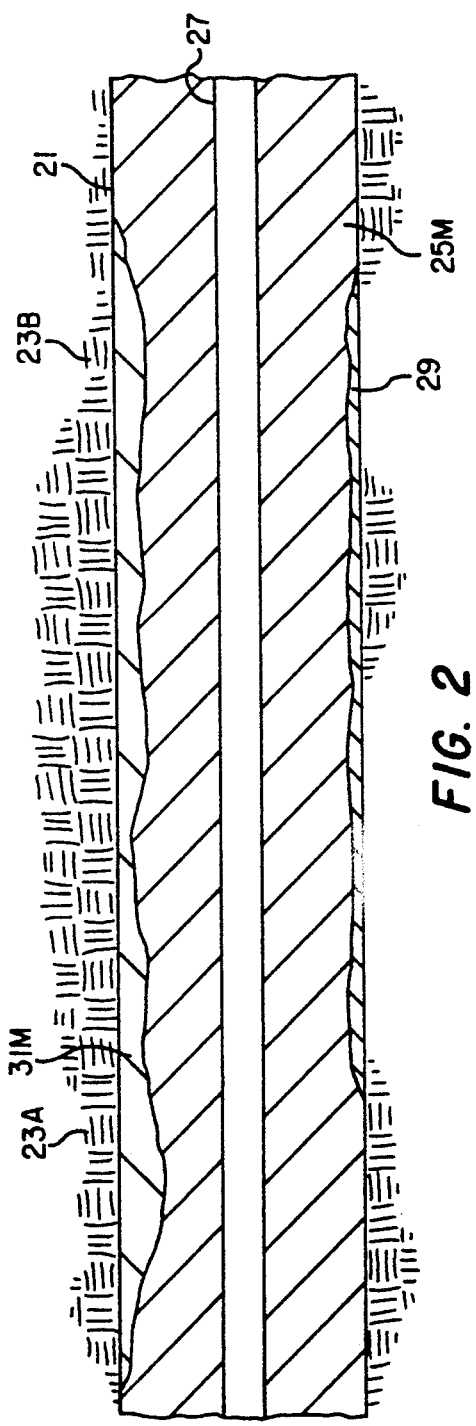

METHOD USING MICRO-SPHERE CEMENT SLURRIES FOR DEVIATED WELLS

FIELD OF THE INVENTION

This invention relates to cement slurries for subsurface oil field applications.

DESCRIPTION OF PRIOR ART

The prior art is replete with many disclosures of cementing in wells penetrating subterranean formations in oil field technology. Typically, when cementing a well, a cement spacer fluid and then one or more cement slurries are employed to displace/replace drilling fluid from an area of the wellbore and secure hydraulic zonal isolation across the cemented interval. Failure to achieve adequate zonal isolation is one of the primary problems encountered in oil field cementing.

The development of a free water channel along the top side of the annulus is well documented in the literature on cementing deviated wellbores. This phenomena was first described in SPE 8958 W. W. Webster and J. V. Eikerts and has been confirmed in numerous subsequent investigations. These studies have shown that as the angle of inclination increases, so does the extent and rate of development of the free water channel. The existence of this channel effectively destroys zonal isolation.

Past efforts to prevent downhole occurrence of these channels have focused on maintaining high rheological indices at downhole temperatures. The problem with this approach has been that the design process becomes very restrictive and the resultant design typically generates greater friction pressure forces or Equivalent Circulated Densities (ECD's). These designs also remain extremely susceptible to improper density control.

We are currently developing a series of different density cements, which use primarily hollow microspheres to eliminate the high side free water channels in horizontal wellbores. These micro-sphere laden cements excel over the presently used conventional cements in performance, specifically, they greatly reduce design and application problems while enhancing hydraulic isolation potential.

We have adopted existing material technologies and used them in a special way to capitalize on their features and benefits and provide a series of unique cements for the assignees operation.

The intent of this practice is to force gravity to improve isolation potential. This practice is applicable to any wellbore that deviates from vertical. It is particularly useful for those wellbore that deviate more than 25 degrees from vertical.

SUMMARY OF INVENTION

Accordingly, it is the object of &his invention to provide a method of cementing downhole in a wellbore penetrating subterranean formation, particularly at deviated angles, or in horizontal wells, to achieve substantially complete zonal isolation and improve bonding of equipment in the wellbore.

It is another object of this invention to provide a method of cementing downhole that achieves substantially complete zonal isolation and bonding of equipment to the subterranean formations by way of the cement sheath formed about the equipment and left in place of the well.

These and other objects will become apparent from the descriptive matter hereinafter.

In accordance with one embodiment of this invention, there is provided a method of cementing downhole in wells penetrating subterranean formations, and particularly in highly deviated wells, such as horizontal wells, which includes a cement slurry that incorporates low density, fly ash or borosilicate micro-spheres for the purpose of free water control.

The background of this technology comprises the use of hollow micro-spheres. The low specific gravity (s.g.) of the micro-spheres allows them to migrate upwardly in the aqueous cement suspension. The 0.17–0.9 s.g. of the micro-spheres is sufficiently lower than the 1.0–1.03 s.g. of the cement mix water to induce this upward migration. The concentration micro-spheres along the high side of the wellbore assures cementitious material will remain in this critical area.

BRIEF DESCRIPTION OF THE DRAWINGS

FIG. 1 is a cross-section of a horizontal portion of a well which has been cemented with conventional cement.

FIG. 2 is a cross-section of a horizontal portion of a well which has been cemented with the cement of the invention.

DESCRIPTION OF THE PREFERRED EMBODIMENT

As a wellbore is deviated from vertical, the path length for coalescence of cement free water is sharply reduced and the high side surface area greatly increased. This mechanism, plus the easier migratory path available at the cement formation interface drives the free water increase in deviation well bores.

FIG. 1 illustrates a cross-section of a horizontal portion of a well 21 formed through subsurface formations 23A, 23B, etc. and which has been cemented with 15.8 ppg conventional cement 25. The upper end of the well may be on the left and the lower end on the right. A production tube is shown at 27. In the cementing process, the cement is injected down the tube 27 and through suitable lower equipment such as an up-jet shoe where it flows upward to the position shown in FIG. 1. The purpose of the cement is to isolate a zone in the well above or below the cement. Gravitational sedimentation of high density solids is shown at 29 and a free water channel is shown at 31. The free water channel can extend past the upper or lower end of the cement or across adjacent formations and therefore prevent effective isolation. This can lead to lost reserves or excessive water and gas production, the latter of which is no& always desired. When particulates, such as microspheres, less dense than the cement are added to the cement slurry, they will preferentially float or migrate above and in the cement free water. This provides a uniform cylindrical suspension of cementitious solids that will harden without the void (free water channel) common to conventional cements that are cured at deviated angles. The fly ash or borosilicate glass microspheres serve as a reactive "place holder". They maintain a solid packing in the top of the well bore or annulus and react with the calcium rich mix water to form a cementitious solid or pozzolan cement. This protection can be further enhanced with the use of fumed silica to decrease mix water separation and reduce the permeability of the microsphere cement.

FIG. 2 illustrates the same well of FIG. 1 but cemented with the cement 25M of the invention which includes the particulates such as the micro-spheres. Some of the micro-spheres have floated or migrated to the top as shown at 31M resulting in a cylindrical suspension of cementitious solids in the well that will harden without void or free water channel. Although the invention is shown used in a horizontal well portion in FIG. 2, it is to be understood that the invention may be used in well portions deviated from the vertical at angles different than 90 degrees.

Highly deviated including horizontal well bores, provide an extended reach that have been produced heretofore without any cementing ever though it is recognized that cementing provides selective zonal isolation and frequently improves the performance and flexibility of later production operations. Such cementing frequently employs set packers to provide zonal isolation until the cement can solidify. The type of cementing, as in this invention, provides a cement sheath that remains in place of the wellbore providing zonal isolation because of the enhanced isolation properties in the horizontal section of the well.

Low density micro-spheres, such as those formed from pozzolan or borosilicate glass, or ceramic, have a density or specific gravity (s.g.) less than the 1.0–1.03 s.g. of the cement mix water. Thus, the less dense spheres (0.37–0.9 s.g.) will form a cementitious material along the top of the horizontal sections and will prevent the free water channels from forming. Free water channels can destroy zonal isolation.

The use of a low density cement slurry incorporating micro-spheres is acknowledgedly old in cementing wells penetrating subterranean formations, but not for the prevention of water channels in horizontal or deviated wellbores.

Cement slurries with densities ranging from 16.0–8.5 ppg are being developed for field implementation of this technology. The quantity of micro-spheres may range from as little as 5% (BWOC) by weight of cement to as much as 150%. These designs may or may not incorporate fumed silica or other generally applied cement admixes. Cement slurries meeting the above parameters have been placed in two wells to date. The Western Districts (Bakersfield, Calif.) Yowlume 16X-4 and Kuparak's River Unit's (Alaska) 1R/21. Both wells were drilled horizontally and produced superior zonal isolation without high side channeling.

EXAMPLE I

The following examples are cement slurries that have been employed to give about 9 pounds per gallon cement slurry density.

Basic Designs: 9.0 PPG (when percentages are indicated herein, they are percentages by weight - % by wt)
Type I Cement+100% Ceramic Bubbles+10% Fumed Silica+132.5% Water
PV=97 YP=37 Compressive Strength: 700 PSI @24 hrs. @190 degrees F. BHST
Type I Cement+100% Ceramic Bubbles+1% Fumed Silica+0.6% Retarder+112.5% Water
PV=118 YP=6 Thickening Time: 2 hrs. 56 mins. @190 degrees F. BHCT
Type III Cement+100% Ceramic Bubbles+10% Fumed Silica +132.5% Water
pV=63 Yp=8 Compressive Strength 875 PSI @24 hrs. @190 degrees F. BHST
Type III Cement+100% Ceramic Bubbles+10% Fumed Silica +116.5% Water
PV=68 YP=48 Compressive Strength: 1200 PSI @24 hrs. @190 degrees F. BHST
Type I Cement+100% Ceramic Bubbles+10% Fumed Silica+0.6% Dispersant+0.6% Fluid Loss Additive+0.5% Retarder+140% Water
PV=102 YP=30

EXAMPLE II

The following system was used in the Yowlume 16X-4 (when percentages are employed herein they are percentages by weight):
Type III Cement+110 Ceramic Bubbles+10% Fumed Silica +0.6% Dispersant+06% Fluid Loss Additive+0.5% Retarder+140% Water*

*System used in the Yowlume 16X-4 well in California and gave excellent results.

PV=70 YP=30 T.T.: 4 hrs. 35 min. @190 degrees F. BHCT F.L.=85 CC/30 min. Free Water=0.0 at 45 degree angle
Compressive Strength: 500 psi in 9 hrs. 1900 psi in 12 hrs.

In accordance with this invention it is noted that the low density cements spheres eliminate the free water channels by floating to the top, producing a competent cement and blocking the development of free water channels.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

Reference is made to *Well Cementing* by Erick B. Nelson, Schlumberger Educational Services, 1990, for a more detailed description of micro-spheres, micro-silica, and zonal isolation.

What is claimed is:

1. A method of cementing a section of a well penetrating subterranean formations and which section deviates more than twenty-five degrees from the vertical comprising the steps of:
   a. flowing a micro-sphere laden cement slurry into the well and to said section; and
   b. leaving the cement slurry in said section of the well to bond the equipment in said section of the well and provide improved zonal isolation by eliminating development of free water channels.

2. The method of claim 1 wherein said cement slurry is formed with micro-spheres selected from the class consisting of fly ash or borosilicate glass spheres that are hollow, so as to rise to the top, their specific gravity range being in the range of 0.3–1.0 inclusive.

3. The improved method of claim 2 wherein about 5–50% fumed silica is employed in the cement.

4. The method of claim 1 wherein said micro-sphere laden cement reduces slurry density while providing excellent cementitious properties; provides excellent slurry properties for ease in mixing and displacement; creates a slurry that can be designed to have upward migration of cementitious solids in a deviated section of a well to eliminate the high side free water channels; and improves success rates; wherein the cement slurry will set to provide a compressive strength in excess of 1,000 psi.

5. The method of claim 1 wherein said micro-sphere laden cement reduces slurry density while providing excellent cementitious properties; provides excellent slurry properties for ease in mixing and displacement; create a slurry that can be designed to have upward migration of cementitious solids in a deviated section of a well to eliminate the high side free water channels; and improves success rates; wherein the cement slurry will set to provide a compressive strength in excess of 500 psi.

6. The method of claim 1, wherein said steps are carried out in a generally horizontal section of the well.

7. The method of claim 2, wherein said steps are carried out in a generally horizontal section of the well.

8. The method of claim 3, wherein said steps are carried out in a generally horizontal section of the well.

9. The method of claim 4, wherein said steps are carried out in a generally horizontal section of the well.

10. The method of claim 5, wherein said steps are carried out in a generally horizontal section of the well.

* * * * *